United States Patent
Liang et al.

(10) Patent No.: US 11,961,969 B2
(45) Date of Patent: *Apr. 16, 2024

(54) NONAQUEOUS ELECTROLYTE, LITHIUM-ION BATTERY, BATTERY MODULE, BATTERY PACK, AND APPARATUS

(71) Applicant: CONTEMPORARY AMPEREX TECHNOLOGY CO., LIMITED, Ningde (CN)

(72) Inventors: Chengdu Liang, Ningde (CN); Chenghua Fu, Ningde (CN); Peipei Chen, Ningde (CN); Junmin Feng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 518 days.

This patent is subject to a terminal disclaimer.

(21) Appl. No.: 17/196,943

(22) Filed: Mar. 9, 2021

(65) Prior Publication Data

US 2021/0202998 A1    Jul. 1, 2021

Related U.S. Application Data

(63) Continuation of application No. PCT/CN2019/108607, filed on Sep. 27, 2019.

(30) Foreign Application Priority Data

Sep. 28, 2018    (CN) .......................... 201811140346.6

(51) Int. Cl.
| | |
|---|---|
| *H01M 10/0569* | (2010.01) |
| *H01M 10/0525* | (2010.01) |
| *H01M 10/0567* | (2010.01) |

(52) U.S. Cl.
CPC ... *H01M 10/0569* (2013.01); *H01M 10/0525* (2013.01); *H01M 10/0567* (2013.01); *H01M 2220/20* (2013.01); *H01M 2300/0037* (2013.01)

(58) Field of Classification Search
None
See application file for complete search history.

(56) References Cited

U.S. PATENT DOCUMENTS

| | | |
|---|---|---|
| 6,245,465 B1 | 6/2001 | Angell et al. |
| 9,373,867 B2 | 6/2016 | Kawasaki et al. |
| 9,905,887 B2 | 2/2018 | Takahashi et al. |
| 2013/0224606 A1 | 8/2013 | Koh et al. |
| 2014/0017559 A1 | 1/2014 | Kawasaki et al. |
| 2015/0140443 A1 | 5/2015 | Takahashi et al. |
| 2017/0084951 A1 | 3/2017 | DuBois et al. |
| 2017/0301952 A1 | 10/2017 | Changlong |
| 2020/0321657 A1 | 10/2020 | Burkhardt et al. |

FOREIGN PATENT DOCUMENTS

| | | |
|---|---|---|
| CN | 103107368 A | 5/2013 |
| CN | 103190027 A | 7/2013 |
| CN | 103443991 A | 12/2013 |

(Continued)

OTHER PUBLICATIONS

Ningder Age New Energy Technology Co. Ltd., Notification to Grant Patent Right for Invention, CN201811140346.6, dated Jan. 26, 2021, 4 pgs.
Ningder Age New Energy Technology Co. Ltd., First Office Action, CN201811140346.6, dated Sep. 2, 2020, 20 pgs.
Contemporary Amperex Technology Co., Limited, Extended European Search Report, EP19864523.6, dated Sep. 20, 2021, 10 pgs.

(Continued)

*Primary Examiner* — Carlos Barcena
(74) *Attorney, Agent, or Firm* — Kilpatrick Townsend & Stockton LLP

(57) ABSTRACT

This application provides a nonaqueous electrolyte, a lithium-ion battery, a battery module, a battery pack, and an apparatus. The nonaqueous electrolyte includes a nonaqueous solvent, a lithium salt, and an additive. The nonaqueous solvent is a high oxidation potential solvent, and the additive includes cyclic sulfate. The high oxidation potential solvent is selected from one or more of compounds represented by formula I and formula II, and the cyclic sulfate may be selected from one or more of compounds represented by formula III. This application can not only improve electrochemical performance of the lithium-ion battery under high temperature and high voltage and improve safety performance such as overcharge safety and hot box safety of the lithium-ion battery, but also ensure that the lithium-ion battery has some kinetic performance.

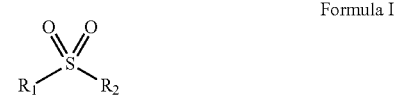

Formula I

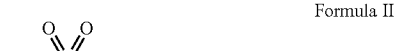

Formula II

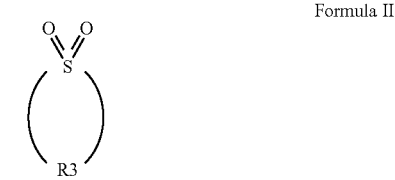

Formula III

20 Claims, 4 Drawing Sheets

(56) References Cited

FOREIGN PATENT DOCUMENTS

| | | | | |
|---|---|---|---|---|
| CN | 104300172 | A | 1/2015 | |
| CN | 104364958 | A | 2/2015 | |
| CN | 104798245 | A | 7/2015 | |
| CN | 105140561 | A | 12/2015 | |
| CN | 105144460 | A | 12/2015 | |
| CN | 105576283 | A | 5/2016 | |
| CN | 105633465 | A | 6/2016 | |
| CN | 105655644 | A | 6/2016 | |
| CN | 105870505 | A | 8/2016 | |
| CN | 107077976 | A | 8/2017 | |
| CN | 107681198 | A | 2/2018 | |
| EP | 2631980 | A1 | 8/2013 | |
| JP | 2003132944 | A | 5/2003 | |
| JP | 2014049294 | A | 3/2014 | |
| JP | 2014049294 | A * | 3/2014 | ........ H01M 10/0567 |
| WO | WO9919932 | A1 | 4/1999 | |
| WO | WO2015179205 | A1 | 11/2015 | |
| WO | WO2017209762 | A1 | 12/2017 | |

OTHER PUBLICATIONS

Contemporary Amperex Technology Co., Limited, International Search Report and Written Opinion, PCT/CN2019/108607, dated Dec. 31, 2019, 14 pgs.

* cited by examiner

NONAQUEOUS ELECTROLYTE, LITHIUM-ION BATTERY, BATTERY MODULE, BATTERY PACK, AND APPARATUS

CROSS-REFERENCE TO RELATED APPLICATIONS

This application is a continuation application of PCT Patent Application No. PCT/CN2019/108607, entitled "NONAQUEOUS ELECTROLYTE, LITHIUM-ION BATTERY, BATTERY MODULE, BATTERY PACK, AND APPARATUS" filed on Sep. 27, 2019, which claims priority to Chinese Patent Application No. 201811140346.6, filed on Sep. 28, 2018 and entitled "NONAQUEOUS ELECTROLYTE and LITHIUM-ION BATTERY", both of which are incorporated herein by reference in their entirety.

TECHNICAL FIELD

This application relates to the field of batteries, and in particular, to a nonaqueous electrolyte, a lithium-ion battery, a battery module, a battery pack, and an apparatus.

BACKGROUND

Lithium-ion batteries are widely applied to electric vehicles and consumer electronic products due to their advantages such as high energy density, high output power, long cycle life, and low environmental pollution. Current requirements for lithium-ion batteries are high voltage, high power, long cycle life, long storage life, and superb safety performance.

At present, nonaqueous electrolyte systems that use lithium hexafluorophosphate as a conductive lithium salt and cyclic carbonate and/or linear carbonate as a solvent are widely applied in lithium-ion batteries. However, the above nonaqueous electrolytes still have many shortcomings. For example, in a high-voltage system, cycle performance, storage performance and safety performance of the above nonaqueous electrolytes need to be improved. For another example, in a lithium cobalt oxide or high nickel ternary system, safety performance such as overcharge safety and hot box safety of lithium-ion batteries needs to be improved.

SUMMARY

In view of the problems in the Background, this application is intended to provide a nonaqueous electrolyte, a lithium-ion battery, a battery module, a battery pack, and an apparatus. The nonaqueous electrolyte can not only improve electrochemical performance of a lithium-ion battery under high temperature and high voltage and improve safety performance such as overcharge safety and hot box safety of a lithium-ion battery, but also ensure that the lithium-ion battery has some kinetic performance.

To achieve the above objective, in a first aspect of this application, this application provides a nonaqueous electrolyte, including a nonaqueous solvent, a lithium salt, and an additive. The nonaqueous solvent is a high oxidation potential solvent, and the additive includes cyclic sulfate. The high oxidation potential solvent is selected from one or more of compounds represented by formula I and formula II, and the cyclic sulfate may be selected from one or more of compounds represented by formula III. In formula I, $R_1$ and $R_2$ are independently selected from unsubstituted, partially halogenated, or fully halogenated alkyl groups having 1 to 5 carbon atoms, and at least one of $R_1$ and $R_2$ is a partially halogenated or fully halogenated alkyl group having 1 to 5 carbon atoms; in formula II, $R_3$ is selected from partially halogenated or fully halogenated alkylidene groups having 1 to 6 carbon atoms; and in formula III, $R_4$ is selected from unsubstituted, partially halogenated, or fully halogenated alkylene groups having 1 to 6 carbon atoms. A halogen atom is selected from one or more of F, Cl, Br, and I.

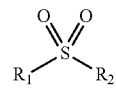

Formula I

Formula II

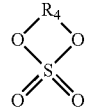

Formula III

According to a second aspect of this application, this application provides a lithium-ion battery, including a positive electrode plate, a negative electrode plate, a separator and the nonaqueous electrolyte according to the first aspect of this application.

According to a third aspect of this application, this application provides a battery module, including the lithium-ion battery according to the second aspect of this application.

According to a fourth aspect of this application, this application provides a battery pack, including the battery module according to the third aspect of this application.

According to a fifth aspect of this application, this application provides an apparatus, including the lithium-ion battery according to the second aspect of this application, where the lithium-ion battery is used as a power supply of the apparatus.

Compared with the prior art, this application includes at least the following beneficial effects:

(1) As the nonaqueous electrolyte in this application uses a high oxidation potential solvent to substitute for a conventional carbonate solvent, the nonaqueous electrolyte can overcome disadvantages of conventional carbonate solvents, such as poor oxidation resistance, easy high-pressure decomposition and gas generation, a low flash point, and easy combustion, and can greatly improve safety performance such as overcharge safety and hot box safety of a lithium-ion battery.

(2) The nonaqueous electrolyte of this application further includes the additive cyclic sulfate. The additive cyclic sulfate may first form a stable interface protective film on the negative electrode, thereby suppressing side reactions of the high oxidation potential solvent on the negative electrode. In addition, the additive cyclic sulfate may generate lithium sulfate that structurally contains an alkoxy structure (—$CH_2CH_2O$—) in the process of film forming on the negative electrode. This can effectively adjust viscoelasticity of the interface protective film on the negative electrode, improve kinetics of lithium ion transfer at the interface, and finally form a thin and dense interface protective film with good kinetics of lithium ion transfer on the negative electrode. This can effectively make up for the defects of large viscosity with the high oxidation potential solvent and poor compatibility with the negative electrode, and be conducive to obtain the lithium-ion battery with good kinetic and electrochemical performance.

(3) In addition, the cyclic sulfate may also form a stable interface protective film on a surface of the positive electrode to further improve oxidation resistance of the nonaqueous electrolyte. Therefore, this is beneficial to improve safety performance of overcharge safety, hot box safety, and the like of the lithium-ion battery to some extent.

The battery module, the battery pack, and the apparatus in this application include the lithium-ion battery, and therefore have at least the same advantages as the lithium-ion battery.

Figure 1:
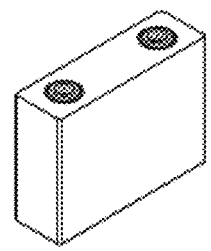
FIG. 1 is a perspective view of an embodiment of a lithium-ion battery.

Reference signs are described as follows:
1. battery pack;
2. upper box body;
3. lower box body;
4. battery module;
5. lithium-ion battery;
51. housing;
52. electrode assembly;
521. first electrode plate;
521a. first current collector;
521b. first active material layer;
522. second electrode plate;
522a. second current collector;
522b. second active material layer;
523. separator;
524. first tab;
525. second tab; and
53. top cover assembly.

DESCRIPTION OF EMBODIMENTS

The following describes in detail a nonaqueous electrolyte, a lithium-ion battery, a battery module, a battery pack, and an apparatus according to this application.

The nonaqueous electrolyte according to the first aspect of this application is described first. The nonaqueous electrolyte includes a nonaqueous solvent, a lithium salt, and an additive. The nonaqueous solvent is a high oxidation potential solvent, and the additive includes cyclic sulfate.

The high oxidation potential solvent is selected from one or more of compounds represented by formula I and formula II. In formula I, $R_1$ and $R_2$ are independently selected from unsubstituted, partially halogenated or fully halogenated alkyl groups having 1 to 5 carbon atoms, and at least one of $R_1$ and $R_2$ is a partially halogenated or fully halogenated alkyl group having 1 to 5 carbon atoms. In formula II, $R_3$ is selected from partially halogenated or fully halogenated alkylidene groups having 1 to 6 carbon atoms.

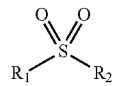

Formula I

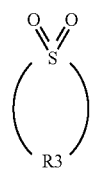

Formula II

The cyclic sulfate is selected from one or more of compounds represented by formula III. In formula III, $R_4$ is selected from unsubstituted, partially halogenated, or fully halogenated alkylidene groups having 1 to 6 carbon atoms.

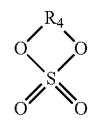

Formula III

In $R_1$, $R_2$, $R_3$, and $R_4$, the halogen atom is selected from one or more of F, Cl, Br, and I, and further, F; alkyl and alkylene may be in a linear structure or a branched structure; and when the alkyl and alkylene are partially or fully halogenated, a quantity of specific types of a halogen atom may be one or more.

Currently, the carbonate solvent is often used as electrolyte in the lithium-ion battery. As this type of solvent has poor oxidation resistance, the solvent has slight oxidation at even about 4V under room temperature (25° C.). As the voltage and temperature increase, the solvent has more and more substantial oxidization and gas generation. In addition, as this type of solvent has a low flash point (generally below 35° C.), the solvent may easily burn when exposed to an open flame, and releases a large amount of heat. Therefore, lithium-ion batteries using conventional carbonate solvents have high potential hazards in safety performance.

In the nonaqueous electrolyte in this application, the high oxidation potential solvent is used to substitute for a conventional carbonate solvent, the high oxidation potential solvent has advantages of high oxidation resistance and non-flammability, can overcome disadvantages of conventional carbonate solvents, such as poor oxidation resistance, easy high-pressure decomposition and gas generation, a low flash point, and easy combustion, and can greatly improve safety performance such as overcharge safety and hot box safety of a lithium-ion battery.

However, although the high oxidation potential solvent has the advantages of high oxidation resistance and non-flammability, the high oxidation potential solvent has poor compatibility with the negative electrode and may cause side reactions on the negative electrode. In addition, viscosity of the high oxidation potential solvent is higher than that of the conventional carbonate solvent. After the high oxidation potential solvent is used to substitute for the conventional carbonate solvent, overall viscosity of the nonaqueous electrolyte is relatively high, and electrical conductivity decreases, so that electrochemical performance of the lithium-ion battery is significantly deteriorated. The additive cyclic sulfate may first form a stable interface protective film on the negative electrode, thereby suppressing side reactions of the high oxidation potential solvent on the negative electrode. In addition, the additive cyclic sulfate might generate lithium sulfate that structurally contained an alkoxy structure (—$CH_2CH_2O$—) in the process of film forming on the negative electrode. This can effectively adjust viscoelasticity of the interface protective film on the negative electrode, improve kinetics of lithium ion transfer at the interface, and finally form a thin and dense interface protective film with good kinetics of lithium ion transfer on the negative electrode. Therefore, the additive cyclic sulfate can effectively make up for the defects of the high oxidation potential solvent with the high viscosity and poor compatibility with the negative electrode, and be conducive to obtain the lithium-ion battery with good kinetic and electrochemical performance. In addition, the cyclic sulfate may also form a stable interface protective film on a surface of the positive electrode to further improve oxidation resistance of the nonaqueous electrolyte. Therefore, this is beneficial to improve safety performance of overcharge safety, hot box safety, and the like of the lithium-ion battery to some extent.

In the nonaqueous electrolyte of this application, in some embodiments, the high oxidation potential solvent contains at least one F atom, and presence of the F atom may better improve the oxidation resistance and flame retardancy of the high oxidation potential solvent.

In the nonaqueous electrolyte of this application, in some embodiments, in formula I, $R_1$ and $R_2$ are independently selected from unsubstituted, partially fluorinated or fully fluorinated alkyl groups having 1 to 5 carbon atoms, and at least one of $R_1$ and $R_2$ is a partially fluorinated or fully fluorinated alkyl group having 1 to 5 carbon atoms; and further, $R_1$ and $R_2$ are independently selected from —$CH_3$, —$CF_3$, —$CH_2CH_3$, —$CF_2CH_3$, —$CH_2CF_3$, —$CF_2CF_3$, —$CH_2CH_2CH_3$, —$CF_2CH_2CH_3$, —$CH_2CH_2CF_3$, —$CH_2CF_2CF_3$, —$CF_2CH_2CF_3$, —$CF_2CF_2CH_3$, and —$CF_2CF_2CF_3$, and at least one of $R_1$ and $R_2$ is —$CF_3$, —$CF_2CH_3$, —$CH_2CF_3$, —$CF_2CF_3$, —$CF_2CH_2CH_3$, —$CH_2CH_2CF_3$, —$CH_2CF_2CF_3$, —$CF_2CH_2CF_3$, —$CF_2CF_2CH_3$, or —$CF_2CF_2CF_3$.

In the nonaqueous electrolyte of this application, in some embodiments, in formula II, $R_3$ is selected from partially fluorinated or fully fluorinated alkylidene groups having 1 to 6 carbon atoms, and further, $R_3$ is selected from —$CHFCH_2CH_2CH_2$—, —$CF_2CH_2CH_2CH_2$—, —$CF_2CH_2CH_2CHF$—, —$CF_2CH_2CH_2CF_2$—, —$CH_2CH_2CHFCH_2$—, —$CH_2CHFCHFCH_2$—, —$CH_2CH_2CH(CF_3)CH_2$—, —$CF_2CH_2CH_2CH_2CH_2$—, —$CF_2CH_2CH_2CH_2CF_2$—, —$CH_2CH_2CH_2CHFCH_2$—, —$CH_2CHFCH_2CHFCH_2$—, —$CH_2CHFCH_2CHFCHF$—, —$CH_2CH_2CH_2CH_2CHF$—, —$CH_2CH_2CH_2CH(CF_3)CH_2$—, —$CF_2CH_2CH_2CH_2CH_2CH_2$—, —$CH_2CH_2CH_2CH_2CHFCH_2$—, —$CH_2CHFCH_2CH_2CHFCH_2$—, —$CF_2CH_2CH_2CH_2CH_2CF_2$—, —$CH_2CH_2CH(CH_3)CH_2CHFCH_2$—, and —$CH_2CH_2CH(CF_3)CH_2CHFCH_2$—.

In the nonaqueous electrolyte of this application, when the substituents $R_1$ and $R_2$ have a large number of carbon atoms and a large molecular weight, the high oxidation potential solvent normally has high viscosity, and the nonaqueous electrolyte may have reduced overall electrical conductivity. This will affect the effect in improving electrochemical performance such as kinetic performance and cycle life of the lithium-ion battery. In some embodiments, $R_1$ and $R_2$ are independently selected from unsubstituted, partially halogenated or fully halogenated alkyl groups having 1 to 3 carbon atoms, and at least one of $R_1$ and $R_2$ is a partially halogenated or fully halogenated alkyl group having 1 to 3 carbon atoms. Further, $R_1$ and $R_2$ are independently selected from unsubstituted, partially fluorinated or fully fluorinated alkyl groups having 1 to 3 carbon atoms, and at least one of $R_1$ and $R_2$ is a partially fluorinated or fully fluorinated alkyl group having 1 to 3 carbon atoms.

In the nonaqueous electrolyte of this application, when the substituent $R_3$ has a large number of carbon atoms and a large molecular weight, the high oxidation potential solvent normally has high viscosity, and the nonaqueous electrolyte may have reduced overall electrical conductivity. This will affect the effect in improving electrochemical performance such as kinetic performance and cycle life of the lithium-ion battery. In some embodiments, $R_3$ is selected from partially halogenated or fully halogenated alkylidene groups having 1 to 4 carbon atoms. Further, $R_3$ is selected from partially fluorinated or fully fluorinated alkylidene groups having 1 to 4 carbon atoms.

In the nonaqueous electrolyte of this application, in some embodiments, the high oxidation potential solvent may be specifically selected from one or more of the following compounds:

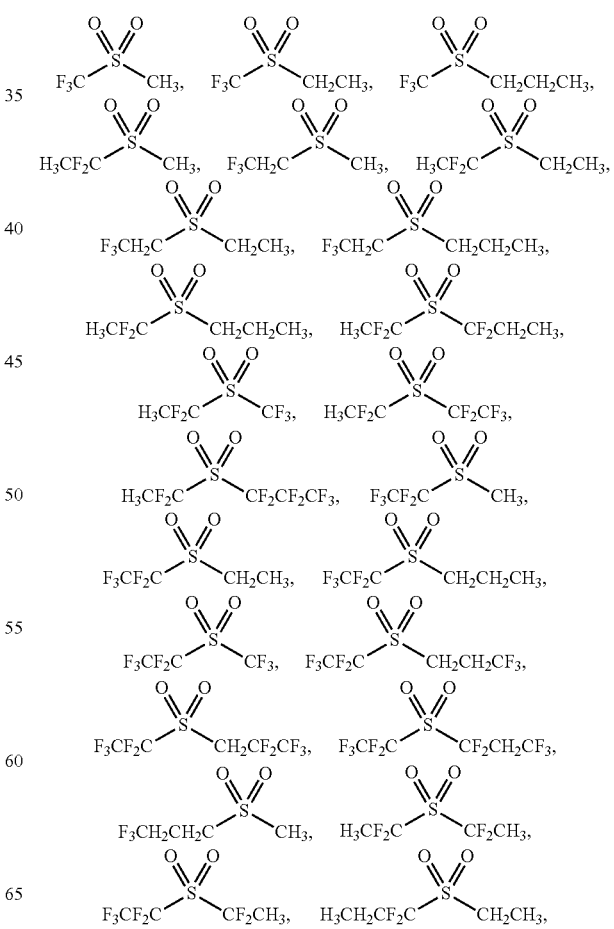

-continued

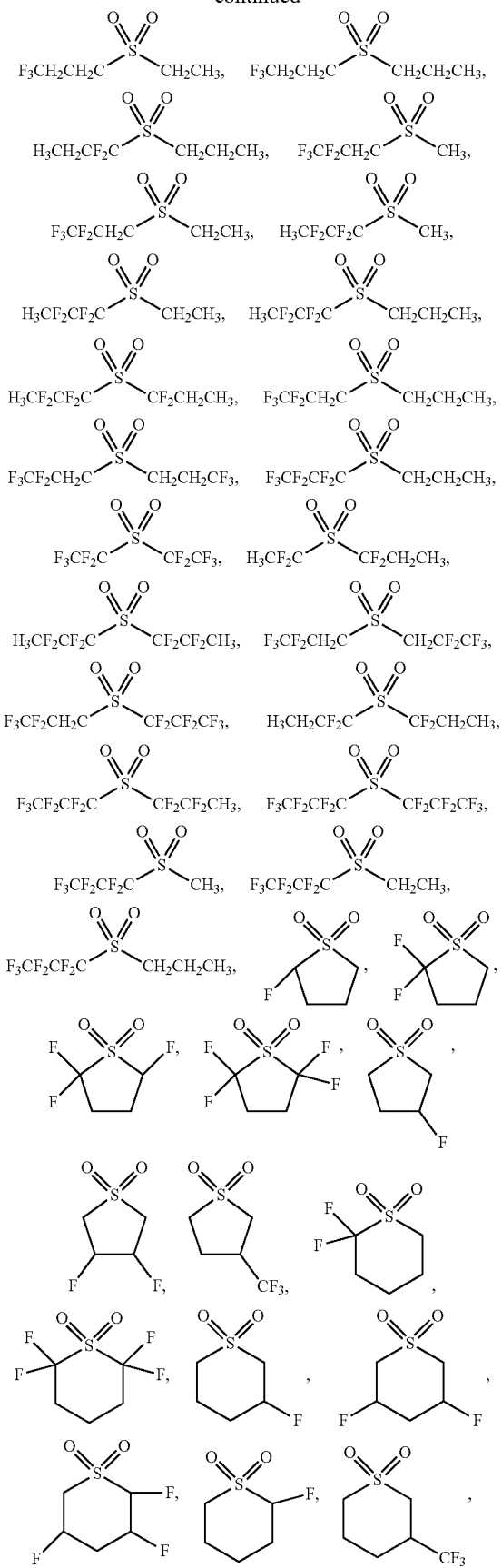

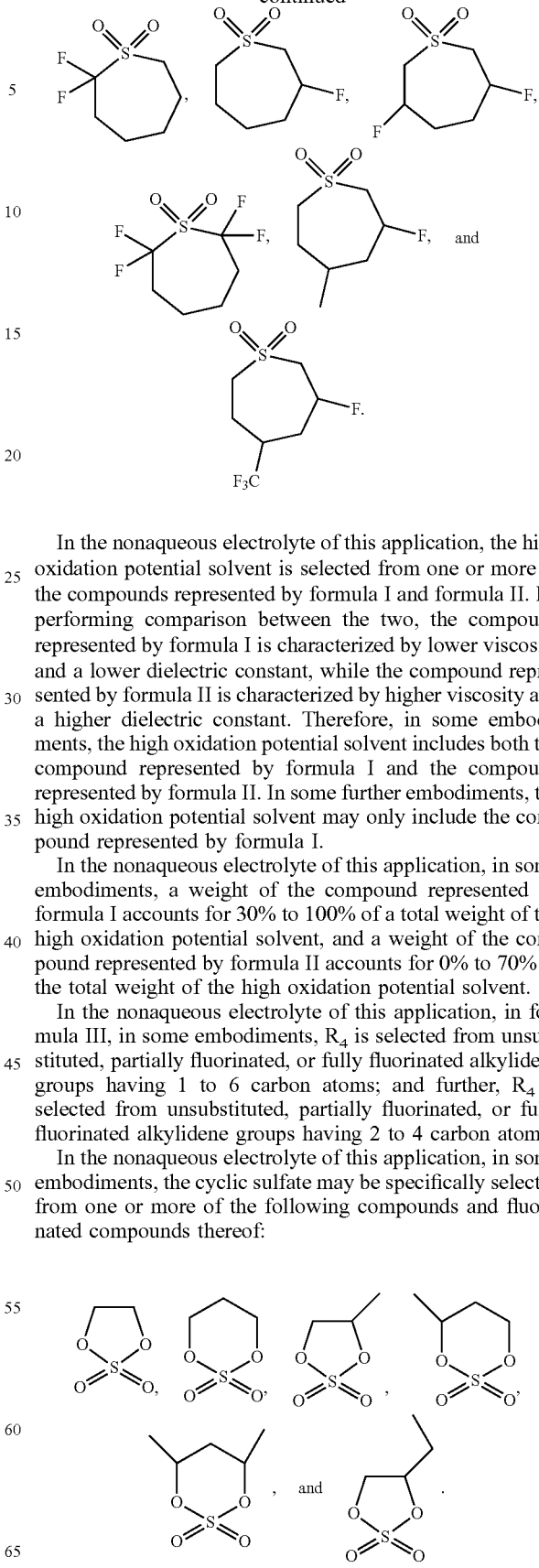

In the nonaqueous electrolyte of this application, the high oxidation potential solvent is selected from one or more of the compounds represented by formula I and formula II. By performing comparison between the two, the compound represented by formula I is characterized by lower viscosity and a lower dielectric constant, while the compound represented by formula II is characterized by higher viscosity and a higher dielectric constant. Therefore, in some embodiments, the high oxidation potential solvent includes both the compound represented by formula I and the compound represented by formula II. In some further embodiments, the high oxidation potential solvent may only include the compound represented by formula I.

In the nonaqueous electrolyte of this application, in some embodiments, a weight of the compound represented by formula I accounts for 30% to 100% of a total weight of the high oxidation potential solvent, and a weight of the compound represented by formula II accounts for 0% to 70% of the total weight of the high oxidation potential solvent.

In the nonaqueous electrolyte of this application, in formula III, in some embodiments, $R_4$ is selected from unsubstituted, partially fluorinated, or fully fluorinated alkylidene groups having 1 to 6 carbon atoms; and further, $R_4$ is selected from unsubstituted, partially fluorinated, or fully fluorinated alkylidene groups having 2 to 4 carbon atoms.

In the nonaqueous electrolyte of this application, in some embodiments, the cyclic sulfate may be specifically selected from one or more of the following compounds and fluorinated compounds thereof:

Further, the cyclic sulfate is

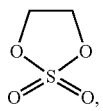

In the nonaqueous electrolyte of this application, when the percentage of the cyclic sulfate is low, side reactions of the high oxidation potential solvent on the negative electrode may not be completely suppressed, thereby affecting the improvement effect on the performance of the lithium-ion battery; and when the percentage of the cyclic sulfate is high, film-forming resistance of an interface between the positive and negative electrodes is greater, thereby further affecting the improvement effect on the performance of the lithium-ion battery. In some embodiments, based on the total weight of the nonaqueous electrolyte, a weight percentage of the cyclic sulfate is 0.1% to 10%, and further, the weight percentage of the cyclic sulfate is 0.5% to 5%.

In the nonaqueous electrolyte of this application, a specific type of the lithium salt is not specifically limited. The lithium salt may be any lithium salt used in existing batteries. For example, the lithium salt may be specifically selected from one or more of $LiPF_6$, $LiN(CF_3SO_2)_2$, $LiN(FSO_2)_2$ (LiFSI), $LiBF_4$, $LiCF_3SO_3$, and $LiClO_4$.

In order to further improve kinetic performance of the lithium-ion battery, in some embodiments, the lithium salt is a mixed lithium salt of $LiPF_6$ and $LiN(FSO_2)_2$. $LiN(FSO_2)_2$ has advantages of moderate viscosity and a high degree of dissociation, and can promote ion conduction to improve electrical conductivity of the nonaqueous electrolyte, helping to obtain a lithium-ion battery with good kinetic performance. In addition, as thermal stability of $LiN(FSO_2)_2$ is relatively high, $LiN(FSO_2)_2$ also improves safety performance such as overcharge safety and hot box safety of the lithium-ion battery to some extent.

In the mixed lithium salt formed by $LiPF_6$ and $LiN(FSO_2)_2$, when relative content of $LiN(FSO_2)_2$ is higher, electrical conductivity of the nonaqueous electrolyte is significantly improved, and kinetic performance of the lithium-ion battery is significantly improved, but a risk of corrosion to a current collector (such as aluminum foil) also increases, which is detrimental to cycle performance of the lithium-ion battery. When relative content of $LiPF_6$ is higher, the effect made by $LiN(FSO_2)_2$ in improving kinetic performance and safety performance of the lithium-ion battery is limited. In some embodiments, a weight ratio of $LiPF_6$ to $LiN(FSO_2)_2$ is 10:1 to 1:10. Further, the weight ratio of $LiPF_6$ to $LiN(FSO_2)_2$ is 4:1 to 1:4.

In the nonaqueous electrolyte of this application, specific concentration of the lithium salt is not specifically limited either, and may be adjusted according to an actual need. For example, concentration of the lithium salt may specifically be 0.7 mol/L to 2 mol/L.

In the nonaqueous electrolyte of this application, in some embodiments, the nonaqueous electrolyte may further include other film-forming additives, and the film-forming additives help to further form an interface protective film of superior performance on the negative electrode and the positive electrode, thereby further improving electrochemical performance such as kinetic performance, cycle life, and storage life of the lithium-ion battery.

In some embodiments, based on the total weight of the nonaqueous electrolyte, a weight percentage of the film-forming additives is 0.01% to 10%. Further, based on the total weight of the nonaqueous electrolyte, the weight percentage of the film-forming additives is 0.1% to 5%.

In some embodiments, the film-forming additives may be specifically selected from one or more of a cyclic carbonate compound with an unsaturated bond, a halogen-substituted cyclic carbonate compound, a sulfite compound, a sultone compound, a disulfonate compound, a nitrile compound, an aromatic compound, an isocyanate compound, a phosphazene compound, a cyclic anhydride compound, a phosphite compound, a phosphate compound, a borate compound, and a carboxylate compound.

In some embodiments, the film-forming additives may be specifically selected from one or more of vinylene carbonate (VC), fluoroethylene carbonate (FEC), difluoroethylene carbonate (DFEC), 1,3-propane sultone (PS), 1,3-propene sultone (PES), adiponitrile (ADN), and succinonitrile (SN). These types of film-forming additives help to form a stable interface protective film on the negative electrode and the positive electrode, and effectively inhibit side reactions of the high oxidation potential solvent on the negative electrode and the positive electrode, thereby better improving electrochemical performance such as kinetic performance, cycle life, and storage life of the lithium-ion battery. Further, the film-forming additives include at least FEC. This is because FEC may also form a stable interface protective film on the negative electrode, and weaken reduction reactions of the cyclic sulfate on the negative electrode. This may help to improve film forming mass of the cyclic sulfate on a surface of the positive electrode, and may further facilitate improvement of cycle life of the lithium-ion battery.

Next, the lithium-ion battery according to the second aspect of this application is described.

Figure 2:
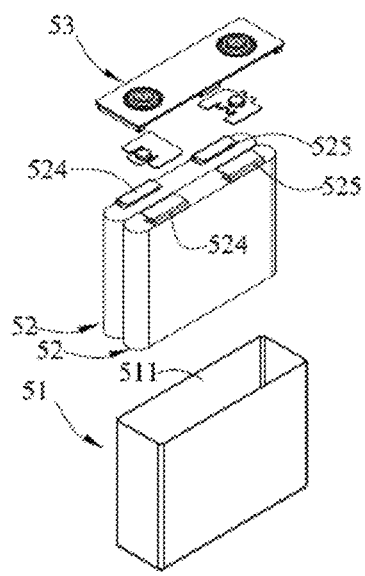
FIG. 2 is an exploded view of FIG. 1.
Figure 3:
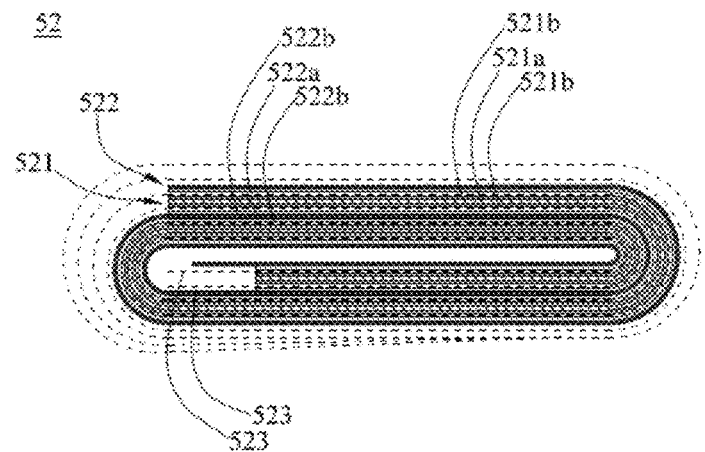
FIG. 3 is a schematic diagram of an embodiment of an electrode assembly of the lithium-ion battery in FIG. 2, in which a first electrode plate, a second electrode plate, and a separator are wound to form a wound electrode assembly.
Figure 4:
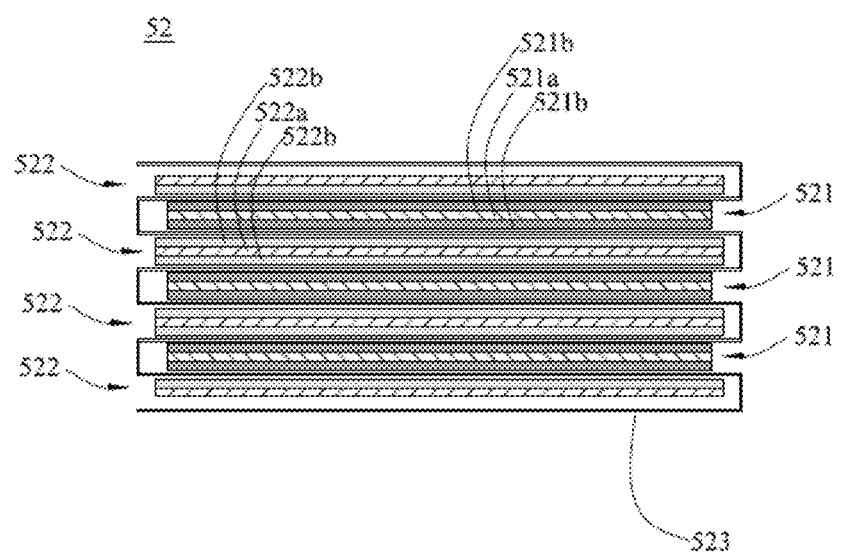
FIG. 4 is a schematic diagram of another embodiment of an electrode assembly of the lithium-ion battery in FIG. 2, in which a first electrode plate, a second electrode plate, and a separator are laminated along a thickness direction to form a laminated electrode assembly.

FIG. 1 is a perspective view of an embodiment of a lithium-ion battery 5. FIG. 2 is an exploded view of FIG. 1. FIG. 3 is a schematic diagram of an embodiment of an electrode assembly 52 of the lithium-ion battery 5 in FIG. 2, in which a first electrode plate 521, a second electrode plate 522, and a separator 523 are wound to form a wound electrode assembly. FIG. 4 is a schematic diagram of another embodiment of an electrode assembly 52 of the lithium-ion battery 5 in FIG. 2, in which a first electrode plate 521, a second electrode plate 522, and a separator 523 are laminated along a thickness direction to form a laminated electrode assembly.

With reference to FIG. 1 to FIG. 4, the lithium-ion battery 5 includes a housing 51, the electrode assembly 52, a top cover assembly 53, and an electrolyte (not shown).

The electrode assembly 52 is accommodated in the housing 51. The electrode assembly 52 includes the first electrode plate 521, the second electrode plate 522, the separator 523, a first tab 524, and a second tab 525. The separator 523 separates the first electrode plate 521 from the second electrode plate 522.

The first electrode plate 521 includes a first current collector 521a and a first active material layer 521b provided on a surface of the first current collector 521a. The first active material layer 521b contains a first active material. The first active material layer 521b may be provided on one surface or two surfaces of the first current collector 521a depending on an actual need. The second electrode plate 522 includes a second current collector 522a and a second active material layer 522b provided on a surface of the second current collector 522a. The second active material layer 522b may be provided on one surface or two surfaces of the second current collector 522a depending on an actual need. The second active material layer 522b contains a second active material. The first active material and the second active material implement deintercalation of lithium ions. Electrical polarities of the first electrode plate 521 and the second electrode plate 522 are opposite. To be specific, one of the first electrode plate 521 and the second electrode plate 522 is a positive electrode plate, and the other of the first electrode plate 521 and the second electrode plate 522 is a negative electrode plate. The first tab 524 may be formed by cutting the first current collector 521a, or may be formed separately and fixedly connected to the first current collector 521a. Similarly, the second tab 525 may be formed by cutting the second current collector 522a, or may be formed separately and fixedly connected to the second current collector 522a.

A quantity of the electrode assemblies 52 is not limited, and may be one or more.

The electrolyte is injected into the housing 51 and impregnates the electrode assembly 51. Specifically, the electrolyte impregnates the first electrode plate 521, the second electrode plate 522, and the separator 523.

It is noted that the lithium-ion battery 5 shown in FIG. 1 is a tank type battery, but is not limited thereto. The lithium-ion battery 5 may be a pouch type battery, which means that the housing 51 is replaced by a metal plastic film and the top cover assembly 53 is eliminated.

In the lithium-ion battery 5, as one of the first electrode plate 521 and the second electrode plate 522 is the positive electrode plate, a current collector of the positive electrode plate is a positive current collector, an active material layer of the positive electrode plate is a positive active material layer, and an active material of the positive electrode plate is a positive active material. As such, the positive electrode plate includes the positive current collector and the positive active material layer provided on a surface of the positive current collector.

In another word, the lithium-ion battery according to the third aspect of this application includes a positive electrode plate, a negative electrode plate, a separator and the nonaqueous electrolyte according to the first aspect of this application.

In the lithium-ion battery in this application, the positive electrode plate may include a positive active material, a conductive agent and a binder. The positive active material may be selected from a layered lithium-containing oxide, a spinel-type lithium-containing oxide, and the like. Specifically, the positive active material may be selected from one or more of a lithium cobalt oxide, a lithium nickel oxide, a lithium manganese oxide, a lithium nickel manganese oxide, a lithium nickel cobalt manganese oxide, and a lithium nickel cobalt aluminum oxide. However, this application is not limited to these materials, and other conventionally well-known materials that can be used as a positive active material of a lithium-ion battery may also be used. One type of these positive active materials may be used alone, or two or more types may be used in combination, at a combination ratio adjustable depending on an actual need. Types of the conductive agent and the binder are not specifically limited, and may be selected depending on an actual need.

When voltage of the lithium-ion battery is higher, the lithium-ion battery may have higher charge and discharge capacity and higher energy density, but a conventional electrolyte may be oxidized to produce gas and release heat. This may change service life and high-temperature performance of the lithium-ion battery, especially in the process of abuse. For example, at a 150° C. hot box, the lithium-ion battery may easily burn. However, the nonaqueous electrolyte of this application contains a high oxidation potential solvent, which can greatly improve oxidation resistance of the nonaqueous electrolyte and reduce heat release, thereby effectively improving high-temperature performance of the lithium-ion battery. As such, the nonaqueous electrolyte in this application can more significantly improve performance of a battery system with high positive electrode oxidation or high positive electrode oxidation potential, especially electrochemical performance of the lithium-ion battery under high temperature and high voltage. Gas generation of the lithium-ion battery under high temperature and high voltage may be even more significantly suppressed, and safety performance such as overcharge safety and hot box safety of the lithium-ion battery may also be more significantly improved.

In some embodiments, the positive active material is one or more of $Li_{1+x}Ni_aCo_bM'_{(1-a-b)}O_{2-c}Y_c$, and $Li_{1+y}Ni_mMn_nM''_{2-m-n}O_{4-p}Z_p$, where $0 \le b < 1$, $0 \le (1-ab) < 1$, $0 \le c < 1$, M' is selected from one or more of Mn, Al, Mg, Zn, Ga, Ba, Fe, Cr, Sn, V, Sc, Ti, and Zr, and Y is selected from one or more of F, Cl, and Br; $-0.1 \le y \le 0.2$, $0.4 \le m \le 1.2$, $0.8 \le n \le 1.6$, $0 \le (2-m-n) \le 0.3$, $0 \le p \le 1$, M'' is selected from one or more of Al, Mg, Zn, Ga, Ba, Fe, Cr, Sn, V, Sc, Ti, and Zr, and Z is selected from one or more of F, Cl, and Br. Further, the positive active material may be specifically selected from one or more of $LiNi_{0.6}Co_{0.2}Mn_{0.2}O_2$, $LiNi_{0.8}Co_{0.1}Mn_{0.1}O_2$, $LiNi_{0.85}Co_{0.15}Al_{0.05}O_2$, and $LiNi_{0.5}Mn_{1.5}O_4$. As Ni content in the positive active material increases, the positive active material has increased charge and discharge capacity, but reduced thermal stability. As such, the positive active material may release a strong oxidizing substance under high temperature, oxidizing the nonaqueous electrolyte and deteriorating high-temperature performance of the lithium-ion battery. The nonaqueous electrolyte of this application contains an oxidation resistant high oxidation potential solvent, which can greatly improve oxidation resistance of the nonaqueous electrolyte and reduce heat release, thereby effectively improving high-temperature performance of the lithium-ion battery.

In the lithium-ion battery in this application, in some embodiments, an end-of-charge voltage of the lithium-ion battery is U, where $4.3V \le U \le 6V$. That is, the nonaqueous electrolyte in this application may increase the end-of-charge voltage of the lithium-ion battery to 4.3V or more.

In the lithium-ion battery in this application, the negative electrode plate may include a negative active material, a conductive agent and a binder. The negative active material may be selected from a carbon-based material, a silicon-based material, a tin-based material, and the like. Specifically, the negative active material may preferably be selected from soft carbon, hard carbon, artificial graphite, natural graphite, silicon, silicon oxide, silicon carbon composite, silicon alloy, tin, tin oxide, tin alloy, lithium titanate, a metal that can form an alloy with lithium, and the like. However, this application is not limited to these materials, and other conventionally well-known materials that can be used as a negative active material of a lithium-ion battery may also be used. One type of these negative active materials may be used alone, or two or more types may be used in combination, at a combination ratio adjustable depending on an actual need. Types of the conductive agent and the binder are not specifically limited, and may be selected depending on an actual need.

In the lithium-ion battery of this application, a specific type of the separator is not specifically limited, and the separator may be made of any separator material used in existing batteries, such as a polyolefin separator, a ceramic separator, or the like. Specifically, the separator may preferably be a polyethylene film, a polypropylene film, a polyvinylidene fluoride film, or a multilayer composite film thereof, but this application is not limited thereto.

Next, the battery module according to the third aspect of this application is described.

Figure 5:
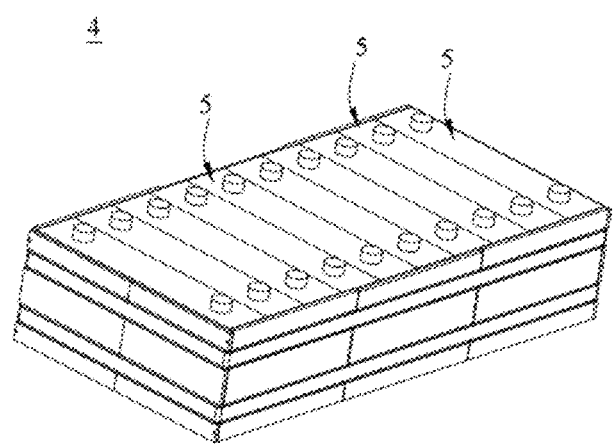
FIG. 5 is a perspective view of an embodiment of a battery module.

FIG. 5 is a perspective view of an embodiment of a battery module 4.

The battery module 4 provided in the third aspect of this application includes the lithium-ion battery 5 according to the second aspect of this application.

Referring to FIG. 5, the battery module 4 includes a plurality of lithium-ion batteries 5. The plurality of lithium-ion batteries 5 are arranged in a longitudinal direction. The battery module 4 may be used as a power supply or an energy storage apparatus. A quantity of lithium-ion batteries 5 included in the battery module 4 may be adjusted based on use and capacity of the battery module 4.

A battery pack according to a fourth aspect of this application is described next.

Figure 6:
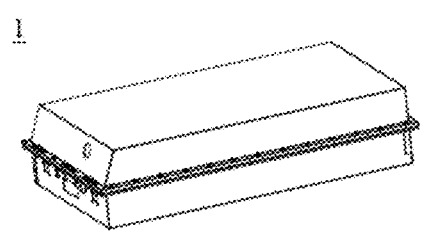
FIG. 6 is a perspective view of an embodiment of a battery pack.
Figure 7:
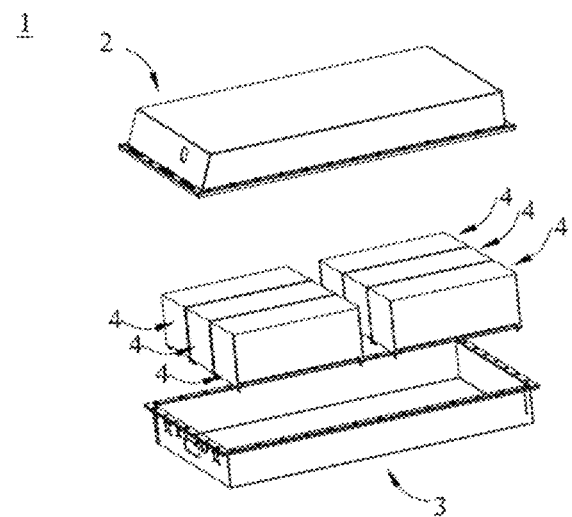
FIG. 7 is an exploded view of FIG. 6.

FIG. 6 is a perspective view of an embodiment of a battery pack 1. FIG. 7 is an exploded view of FIG. 6.

The battery pack 1 provided in the fourth aspect of this application includes the battery module 4 according to the third aspect of this application.

Specifically, referring to FIG. 6 and FIG. 7, the battery pack 1 includes an upper box body 2, a lower box body 3, and the battery module 4. The upper box body 2 and the lower box body 3 are assembled together to form a space for accommodating the battery module 4. The battery module 4 is disposed in the space formed by the upper box body 2 and the lower box body 3 that are assembled together. An output electrode of the battery module 4 penetrates through one or both of the upper box body 2 and the lower box body 3 to output power or to charge from an outer source. A quantity and an arrangement of the battery modules 4 used in the battery pack 1 may be determined depending on an actual need.

An apparatus according to a fifth aspect of this application is described next.

Figure 8:
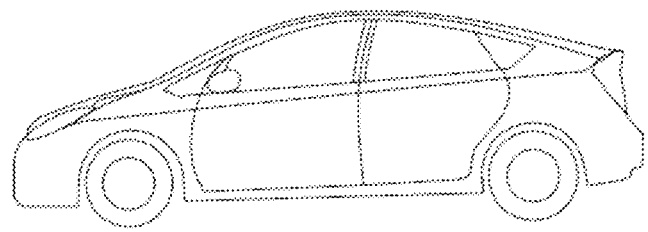
FIG. 8 is a schematic diagram of an embodiment of an apparatus using a lithium-ion battery as a power supply.

FIG. 8 is a schematic diagram of an embodiment of an apparatus using a lithium-ion battery as a power supply.

The apparatus provided in the fifth aspect of this application includes the lithium-ion battery 5 according to the second aspect of this application, where the lithium-ion battery 5 may be used as a power supply for the apparatus. In FIG. 8, the apparatus using the lithium-ion battery 5 is an electromobile. The apparatus using the lithium-ion battery 5 is obviously not limited to this, but may be any electric vehicles other than electromobiles (for example, an electric bus, an electric tram, an electric bicycle, an electric motorcycle, an electric scooter, an electric golf cart, and an electric truck), an electric vessel, an electric tool, an electronic device, and an energy storage system. The electromobile may be a full electric vehicle, a hybrid electric vehicle, or a plug-in hybrid electric vehicle. Certainly, depending on an actual use form, the apparatus provided in the fifth aspect of this application may include the battery module 4 according to the third aspect of this application. Certainly, the apparatus provided in the fifth aspect of this application may also include the battery pack 1 according to the fourth aspect of this application.

To make the application objectives, technical solutions, and beneficial technical effects of this application clearer, this application is further described below in detail with reference to examples. It should be understood that the examples described in this specification are merely intended to explain this application, but not to limit this application. Formulations, proportions, and the like in the examples may be selected as appropriate to local conditions, which has no substantial effect on results.

For ease of explanation, reagents used in the preparation of nonaqueous electrolyte are abbreviated as follows:

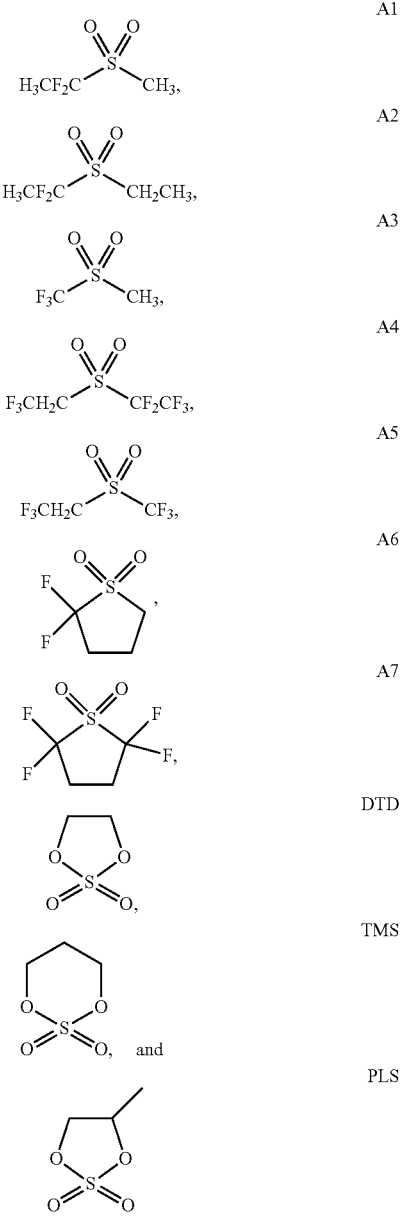

Example 1

(1) Preparation of a Nonaqueous Electrolyte

A compound A1 was used as a nonaqueous solvent; 1 mol/L $LiPF_6$ was dissolved as a lithium salt; and 0.1% DTD was added to prepare a nonaqueous electrolyte.

(2) Preparation of a Positive Electrode Plate

A positive active material $LiNi_{0.5}Mn_{1.5}O_4$, an acetylene black conductive agent, and a polyvinylidene fluoride (PVDF) binder were fully stirred and uniformly mixed in an N-methylpyrrolidone solvent system at a weight ratio of 94:3:3, and then the mixture was applied onto a current collector Al foil, followed by drying and cold pressing to obtain a positive electrode plate.

(3) Preparation of a Negative Electrode Plate

A negative active material artificial graphite, an acetylene black conductive agent, a styrene-butadiene rubber binder, a sodium carboxymethyl cellulose thickener were fully stirred and uniformly mixed at a weight ratio of 95:2:2:1 in a deionized water solvent system, and then the mixture was applied onto a current collector Cu foil, followed by drying and cold pressing to obtain a negative electrode plate.

(4) Preparation of a Separator

A polyethylene film was used as a separator.

(5) Preparation of a Lithium-Ion Battery

The positive electrode plate, the separator, and the negative electrode plate were laminated in order, so that the separator was interposed between the positive electrode plate and negative electrode plate to provide separation. Then the laminated product was wound to obtain an electrode assembly. The electrode assembly was placed in an outer package and dried, and the nonaqueous electrolyte was then injected. Then, after vacuum packaging, standing, chemical conversion, shaping, and other processes, a lithium-ion battery was obtained.

The lithium-ion batteries in Examples 2 to 25 and Comparative Examples 1 to 7 were all prepared according to a method similar to that in Example 1, and specific differences are shown in Table 1.

TABLE 1

Compositions of the nonaqueous electrolytes prepared in Examples 1 to 25 and Comparative Examples 1 to 7

| | Non-aqueous solvent | Cyclic sulfate | | Film-forming additive | | Lithium salt | |
|---|---|---|---|---|---|---|---|
| | | Component | Percentage | Component | Percentage | Component | Concentration mol/l |
| Example 1 | A1 | DTD | 0.1% | / | / | LiPF$_6$ | 1 |
| Example 2 | A1 | DTD | 0.5% | / | / | LiPF$_6$ | 1 |
| Example 3 | A1 | DTD | 1% | / | / | LiPF$_6$ | 1 |
| Example 4 | A1 | DTD | 2% | / | / | LiPF$_6$ | 1 |
| Example 5 | A1 | DTD | 5% | / | / | LiPF$_6$ | 1 |
| Example 6 | A1 | DTD | 8% | / | / | LiPF$_6$ | 1 |
| Example 7 | A1 | DTD | 10% | / | / | LiPF$_6$ | 1 |
| Example 8 | A1 | DTD | 0.05% | / | / | LiPF$_6$ | 1 |
| Example 9 | A1 | DTD | 12% | / | / | LiPF$_6$ | 1 |
| Example 10 | A2 | DTD | 2% | / | / | LiPF$_6$ | 1 |
| Example 11 | A3 | DTD | 2% | / | / | LiPF$_6$ | 1 |
| Example 12 | A4 | DTD | 2% | / | / | LiPF$_6$ | 1 |
| Example 13 | A5 | DTD | 2% | / | / | LiPF$_6$ | 1 |
| Example 14 | A6 | DTD | 2% | / | / | LiPF$_6$ | 1 |
| Example 15 | A7 | DTD | 2% | / | / | LiPF$_6$ | 1 |
| Example 16 | A1 + A6 = 70% + 30% | DTD | 2% | / | / | LiPF$_6$ | 1 |
| Example 17 | A2 + A7 = 60% + 40% | DTD | 2% | / | / | LiPF$_6$ | 1 |
| Example 18 | A1 | TMS | 2% | / | / | LiPF$_6$ | 1 |
| Example 19 | A1 | PLS | 2% | / | / | LiPF$_6$ | 1 |
| Example 20 | A1 | DTD | 2% | / | / | LiPF$_6$:LiFSI = 10:1 | 1 |
| Example 21 | A1 | DTD | 2% | / | / | LiPF$_6$:LiFSI = 1:1 | 1 |
| Example 22 | A1 | DTD | 2% | PS | 2% | LiPF$_6$ | 1 |
| Example 23 | A1 | DTD | 2% | VC | 2% | LiPF$_6$ | 1 |
| Example 24 | A1 | DTD | 2% | FEC | 2% | LiPF$_6$ | 1 |
| Example 25 | A1 | DTD | 2% | ADN | 2% | LiPF$_6$ | 1 |
| Comparative Example 1 | EC + EMC = 50% + 50% | DTD | 2% | / | / | LiPF$_6$ | 1 |
| Comparative Example 2 | A1 | / | / | / | / | LiPF$_6$ | 1 |
| Comparative Example 3 | Methyl ethyl sulfone | DTD | 2% | / | / | LiPF$_6$ | 1 |
| Comparative Example 4 | A1 | / | / | PS | 2% | LiPF$_6$ | 1 |
| Comparative Example 5 | A1 | / | / | VC | 2% | LiPF$_6$ | 1 |
| Comparative Example 6 | A1 | / | / | FEC | 2% | LiPF$_6$ | 1 |
| Comparative Example 7 | A1 | / | / | ADN | 2% | LiPF$_6$ | 1 |

Performance tests for the lithium-ion batteries are described next.

(1) High-Temperature Storage Gas Generation Test

Five lithium-ion batteries prepared in the Examples and five lithium-ion batteries prepared in the Comparative Examples were taken and placed at room temperature, charged to 4.9V at a constant current of 0.5 C (that is, a current value at which the battery completely discharges its theoretical capacity in 2 h), and then charged at a constant voltage of 4.9V until that the current was lower than 0.05 C, such that the lithium-ion batteries were in a 4.9V fully charged state. A volume of a fully charged battery before storage was denoted as D0. The fully charged battery was placed in an oven at 85° C., taken out after 10 days, and tested for a volume after storage, where the volume after storage was denoted as D1.

A volume swelling ratio of the lithium-ion battery was ε=(D1−D0)/D0×100%.

(2) Thermal Shock Safety Performance (Hot Box) Test

Five lithium-ion batteries prepared in the Examples and five lithium-ion batteries prepared in the Comparative Examples were taken and placed at room temperature, charged to 4.9V at a constant current of 0.5 C, and then charged at a constant voltage of 4.9V until the current was lower than 0.05 C. The lithium-ion batteries were then placed in a thermostat, and the thermostat was heated to 150° C. at a heating rate of 5° C./min. Time h1 required for the thermostat to heat up from room temperature to 150° C. was recorded. The lithium-ion battery was then baked in the 150° C. thermostat until the lithium-ion battery caught smoke and a fire. Time h2 from when the thermostat was heated up from room temperature until when the lithium-ion battery caught smoke and a fire was recorded.

The thermal shock safety performance of the lithium-ion battery was characterized by time (h2−h1) for which the lithium-ion battery withstood baking at 150° C.

(3) Cycle Performance Test

Five lithium-ion batteries prepared in the Examples and five lithium-ion batteries prepared in Comparative Examples were taken, and were repeatedly charged and discharged through the following steps, and discharge capacity retention rates of the lithium-ion batteries were calculated.

First, in a room temperature environment, a first cycle of charge and discharge was performed, where the lithium-ion batteries were charged at a constant current of 0.5 C to an upper limit voltage of 4.9V, and then charged at a constant voltage of 4.9V until the current was lower than 0.05 C, and then discharged at a constant discharge current of 0.5 C until a final voltage was 3V. A discharge capacity of the first cycle was recorded. 500 charge and discharge cycles were performed according to the above operations and a discharge capacity of the 500$^{th}$ cycle was recorded.

Cycle capacity retention rate of the lithium-ion battery=(Discharge capacity at the 500$^{th}$ cycle/Discharge capacity at the first cycle)×100%.

(4) Kinetic Performance Test

Five lithium-ion batteries prepared in the Examples and five lithium-ion batteries prepared in the Comparative Examples were taken, and then tested in a room temperature environment. First, the lithium-ion batteries were charged at a constant current of 0.5 C to an upper limit voltage of 4.9V, and then charged at a constant voltage of 4.9V until the current was lower than 0.05 C, and then discharged at a constant current with different rates (0.5 C, 2 C) until a final voltage was 3V. Discharge capacities at different rates were recorded.

The kinetic performance of the lithium-ion battery was characterized by a ratio of a discharge capacity at a rate of 2 C of the lithium-ion battery to a discharge capacity at a rate of 0.5 C of the lithium-ion battery.

TABLE 2

Performance test results of Examples 1 to 25 and the Comparative Examples 1 to 7

| | Volume swelling ratio ε | Hot box safety performance (h2−h1) (min) | Capacity retention rate after cycling | 2C/0.5C |
|---|---|---|---|---|
| Example 1 | 37% | 25 | 60% | 67% |
| Example 2 | 31% | 28 | 74% | 72% |
| Example 3 | 26% | 35 | 79% | 78% |
| Example 4 | 12% | 46 | 82% | 87% |
| Example 5 | 9% | 49 | 85% | 86% |
| Example 6 | 6% | 51 | 83% | 73% |
| Example 7 | 4% | 53 | 81% | 51% |
| Example 8 | 48% | 22 | 54% | 64% |
| Example 9 | 3% | 55 | 62% | 42% |
| Example 10 | 13% | 45 | 83% | 83% |
| Example 11 | 14% | 44 | 83% | 89% |
| Example 12 | 11% | 47 | 82% | 81% |
| Example 13 | 10% | 51 | 83% | 86% |
| Example 14 | 14% | 52 | 79% | 80% |
| Example 15 | 13% | 54 | 76% | 77% |
| Example 16 | 13% | 48 | 82% | 84% |
| Example 17 | 14% | 49 | 81% | 82% |
| Example 18 | 11% | 47 | 82% | 86% |
| Example 19 | 12% | 45 | 82% | 85% |
| Example 20 | 9% | 48 | 84% | 89% |
| Example 21 | 7% | 50 | 80% | 90% |
| Example 22 | 6% | 62 | 84% | 84% |
| Example 23 | 14% | 48 | 87% | 83% |
| Example 24 | 15% | 50 | 89% | 82% |
| Example 25 | 5% | 57 | 80% | 84% |
| Comparative Example 1 | 120% | N/A | 25% | 62% |
| Comparative Example 2 | 54% | 21 | 52% | 63% |
| Comparative Example 3 | 89% | 12 | 42% | 54% |
| Comparative Example 4 | 10% | 42 | 75% | 58% |
| Comparative Example 5 | 62% | 18 | 72% | 50% |
| Comparative Example 6 | 75% | 16 | 70% | 52% |
| Comparative Example 7 | 23% | 37 | 46% | 60% |

It can be seen from the test results of Comparative Example 1 and Examples 1 to 9 that: In Comparative Example 1, the conventional carbonate solvent was used with the additive DTD. The performance of the lithium-ion battery was poor in all aspects, especially the hot box safety performance of the lithium-ion battery was extremely poor. The lithium-ion battery emitted smoke and caught fire in a heating process (up to approximately 120° C.). When the high oxidation potential solvent was used to substitute for the conventional carbonate solvent and the additive cyclic sulfate was used, the high-temperature storage performance and hot box safety performance of the lithium-ion battery could be significantly improved. This is because the high oxidation potential solvent had the advantages of high oxidation resistance and non-flammability. After the high oxidation potential solvent was used to substitute for the conventional carbonate solvent, disadvantages of the conventional carbonate solvent such as poor oxidation resistance, easy high-pressure decomposition and gas generation, a low flash point, and easy combustion could be overcome, and therefore cycle performance and kinetic performance of the lithium-ion battery could be greatly improved.

It can be seen from Comparative Example 2 and Examples 1 to 9 that, in Comparative Example 2, the additive DTD was not used, but only the high oxidation potential solvent was used, and the nonaqueous solvent had higher viscosity, resulting in higher overall viscosity and lower electrical conductivity of the nonaqueous electrolyte. Therefore, cycle performance and kinetic performance of the lithium-ion battery were significantly deteriorated. The addition of DTD could significantly improve the cycle performance, high-temperature storage performance, and kinetic performance of the lithium-ion battery. This is because the DTD might first form a stable interface protective film on the negative electrode, thereby suppressing side reactions of the high oxidation potential solvent on the negative electrode. In addition, the DTD might generate lithium sulfate that structurally contained an alkoxy structure ($-CH_2CH_2O-$) in the process of film forming on the negative electrode. This could effectively adjust viscoelasticity of the interface protective film on the negative electrode, improve kinetics of lithium ion transfer at the interface, and finally might form a thin and dense interface protective film with good kinetics of lithium ion transfer on the negative electrode. This could effectively make up for the defects of large viscosity with the high oxidation potential solvent and poor compatibility with the negative electrode, and therefore also be conducive to obtain the lithium-ion battery with good high-temperature storage performance, kinetic performance, and cycle performance. In addition, the cyclic sulfate might also form a stable interface protective film on a surface of the positive electrode to further improve oxidation resistance of the nonaqueous electrolyte. Therefore, this was beneficial to improve hot box safety performance of the lithium-ion battery to some extent.

It can also be seen from the test results of Examples 1 to 9 that, when an amount of added DTD was low, side reactions of the high oxidation potential solvent on the negative electrode might not be completely suppressed, thereby affecting the improvement effect on the performance of the lithium-ion battery; and when the amount of added DTD was high, film-forming resistance of an interface between the positive and negative electrodes was greater, thereby further affecting the improvement effect on the performance of the lithium-ion battery. Therefore, the amount of added DTD is preferably 0.1% to 10%.

It can be seen from the test results of Comparative Example 3 and Example 4 and Examples 10 to 15 that the high oxidation potential solvents that had not been fluorinated had poorer oxidation resistance and did not exhibit flame retardancy, so that the effect in improving high-temperature storage performance and hot box safety performance of the lithium-ion batteries was not desirable.

Moreover, it can be also seen from the test results of Example 4 and Examples 10 to 17 that the high oxidation potential solvents of different structures also had some impact on performance of the lithium-ion batteries. The high oxidation potential solvent of a cyclic structure was characterized by higher viscosity and higher dielectric constant, and the high oxidation potential solvent of a linear structure was characterized by lower viscosity and lower dielectric constant. Therefore, in some embodiments, the high oxidation potential solvent includes both a high oxidation potential solvent of a linear structure and a high oxidation potential solvent of a cyclic structure. Further, the high oxidation potential solvent only includes a high oxidation potential solvent of a linear structure.

It can be seen from the test results of Example 4 and Examples 20 and 21 that after use of the mixed lithium salt formed by $LiPF_6$ and LiFSI, the kinetic performance and hot box safety performance of the lithium-ion battery was further improved. A possible reason is that with advantages of moderate viscosity and a high degree of dissociation, LiFSI could promote ion conduction to improve electrical conductivity of the nonaqueous electrolyte, helping to obtain lithium-ion batteries with good kinetic performance. In addition, as thermal stability of LiFSI was higher, LiFSI also improved the hot box safety performance of the lithium-ion battery to some extent.

It can be seen from the test results of Comparative Examples 4 to 7 and Example 4 and Examples 22 to 25 that after a film-forming additive, such as PS, VC, FEC, or ADN, was further added into the nonaqueous electrolyte including the high oxidation potential solvent and the additive cyclic sulfate, the lithium-ion battery had further improved the high-temperature storage performance, the hot box safety performance, and the cycle performance. A possible reason is that the film-forming additive had some film forming effect on both the positive electrode and the negative electrode, and the formed film had good stability, which inhibited continuous side reactions of the nonaqueous electrolyte in the cycle and storage processes. As such, impedance of the interface protective films on the positive electrode and negative electrode increased more slowly, and performance of the lithium-ion battery was better.

After FEC was further added, cycle life of the lithium-ion battery was improved most significantly. A possible reason is that: FEC might be reduced on the negative electrode to form a stable interface protective film, thereby weakening reduction reactions of DTD on the negative electrode. This might help to improve film forming mass of DTD on a surface of the positive electrode. Furthermore, after FEC was further added, the cycle life of the lithium ion battery was improved most significantly.

Directly adding PS, VC, FEC, and ADN to the nonaqueous electrolyte that did not include DTD could also improve the performance of the lithium-ion battery to some extent, but the improvement effect of the film-forming additives was worse than that of DTD. Possible reasons are: As film-forming resistance of PS was higher than that of DTD, it was difficult to form a thin and dense interface protective film with good lithium ion migration kinetics on the negative electrode. The kinetic performance of the lithium-ion battery was poor. VC and FEC usually formed a film only on the negative electrode, and oxidized and generated gas on the positive electrode. The high-temperature storage performance and the safety performance of the hot box of the lithium-ion battery were poor. ADN usually acted on only the positive electrode to inhibit the dissolution of metal ions, and also brought side reactions on the negative electrode. Therefore, the defect of poor compatibility between the high oxidation potential solvent and the negative electrode could not be improved, and the kinetic performance and cycle performance of the lithium-ion battery were poor.

According to the disclosure and teaching of this specification, a person skilled in the art of this application may further make appropriate changes or modifications to the foregoing implementations. Therefore, this application is not limited to the foregoing disclosure and the described specific implementations, and some changes or modifications to this application shall also fall within the protection scope of the claims of this application. In addition, although some specific terms are used in the specification, these terms are used only for ease of description, and do not constitute any limitation on this application.

What is claimed is:

1. A nonaqueous electrolyte, comprising a nonaqueous solvent, a lithium salt, and an additive, wherein the nonaqueous solvent is a high oxidation potential solvent, wherein the high oxidation potential solvent is selected from one or more of compounds represented by formula I and formula II;

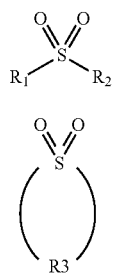

Formula I

Formula II in formula I, $R_1$ and $R_2$ are independently selected from unsubstituted, partially halogenated or fully halogenated alkyl groups having 1 to 5 carbon atoms, and at least one of $R_1$ and $R_2$ is a partially halogenated or fully halogenated alkyl group having 1 to 5 carbon atoms;
in formula II, $R_3$ is selected from partially halogenated or fully halogenated alkylidene groups having 4 to 6 carbon atoms;
based on a total weight of the nonaqueous electrolyte, a weight percentage of the high oxidation potential solvent is at least 10%;
the additive comprises a cyclic sulfate, wherein the cyclic sulfate is selected from one or more of compounds represented by formula III;

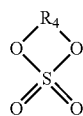

Formula III in formula III, $R_4$ is selected from unsubstituted, partially halogenated, or fully halogenated alkylidene groups having 2 to 6 carbon atoms;
a halogen atom of the $R_2$, $R_2$, $R_3$, and $R_4$ is selected from one or more of F, Cl, Br, and I; and
based on a total weight of the nonaqueous electrolyte, a weight percentage of the cyclic sulfate is 0.1% to 10%.

2. The nonaqueous electrolyte according to claim 1, wherein the halogen atom is F.

3. The nonaqueous electrolyte according to claim 1, wherein
in formula I, $R_1$ and $R_2$ are independently selected from unsubstituted, partially fluorinated, or fully fluorinated alkyl groups having 1 to 5 carbon atoms, and at least one of $R_1$ and $R_2$ is a partially fluorinated or fully fluorinated alkyl group having 1 to 5 carbon atoms;
in formula II, $R_3$ is selected from partially fluorinated or fully fluorinated alkylidene groups having 4 to 6 carbon atoms; and
in formula III, $R_4$ is selected from unsubstituted, partially fluorinated, or fully fluorinated alkylidene groups having 2 to 6 carbon atoms.

4. The nonaqueous electrolyte according to claim 3, wherein $R_1$ and $R_2$ are independently selected from —$CH_3$, —$CF_3$, —$CH_2CH_3$, —$CF_2CH_3$, —$CH_2CF_3$, —$CF_2CF_3$, —$CH_2CH_2CH_3$, —$CF_2CH_2CH_3$, —$CH_2CH_2CF_3$, —$CH_2CF_2CF_3$, —$CF_2CH_2CF_3$, —$CF_2CF_2CH_3$, and —$CF_2CF_2CF_3$, and at least one of $R_1$ and $R_2$ is —$CF_3$, —$CF_2CH_3$, —$CH_2CF_3$, —$CF_2CF_3$, —$CF_2CH_2CH_3$, —$CH_2CH_2CF_3$, —$CH_2CF_2CF_3$, —$CF_2CH_2CF_3$, or —$CH_2CF_2CF_3$, and $R_3$ is selected from —$CHFCH_2CH_2CH_2$—, —$CF_2CH_2CH_2CH_2$—, —$CF_2CH_2CH_2CHF$—, —$CF_2CH_2CH_2CF_2$—, —$CH_2CH_2CHFCH_2$—, —$CH_2CHFCHFCH_2$—, —$CH_2CH_2CH(CF_3)CH_2$—, —$CF_2CH_2CH_2CH_2CH_2$—, —$CF_2CH_2CH_2CH_2CF_2$—, —$CH_2CH_2CH_2CHFCH_2$—, —$CH_2CHFCH_2CHFCH_2$—, —$CH_2CHFCH_2CHFCHF$—, —$CH_2CH_2CH_2CH_2CHF$—, —$CH_2CH_2CH_2CH(CF_3)CH_2$—, —$CF_2CH_2CH_2CH_2CH_2CH_2$—, —$CH_2CH_2CH_2CH_2CHFCH_2$—, —$CH_2CHFCH_2CH_2CHFCH_2$—, —$CF_2CH_2CH_2CH_2CH_2CF_2$—, —$CH_2CH_2CH(CH_3)CH_2CHFCH_2$—, and —$CH_2CH_2CH(CF_3)CH_2CHFCH_2$—.

5. The nonaqueous electrolyte according to claim 3, wherein the cyclic sulfate is selected from one or more of the following compounds and halogenated compounds thereof:

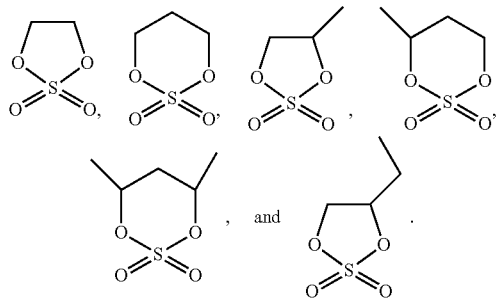

6. The nonaqueous electrolyte according to claim 5, wherein the cyclic sulfate is

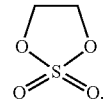

7. The nonaqueous electrolyte according to claim 3, wherein the high oxidation potential solvent is selected from one or more of the following compounds:

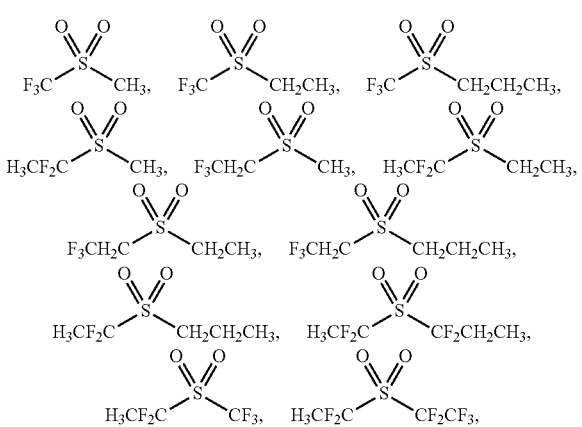

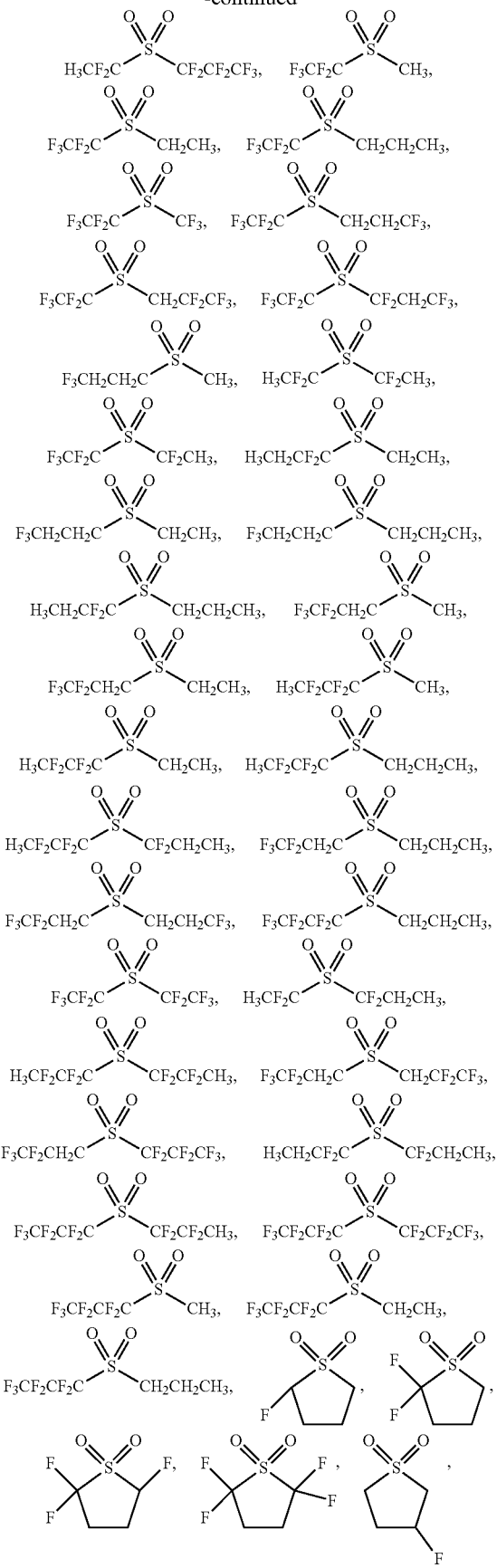

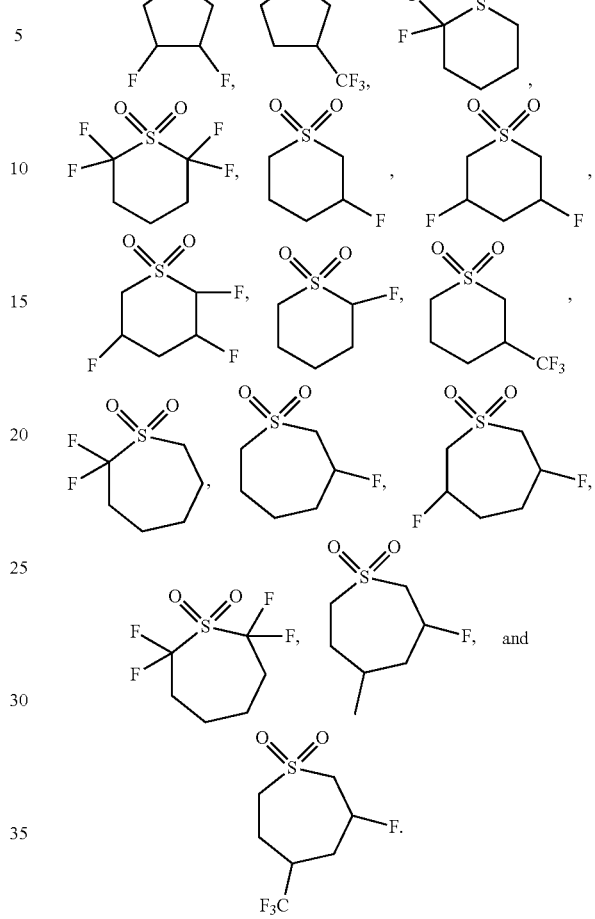

8. The nonaqueous electrolyte according to claim 1, wherein the weight percentage of the cyclic sulfate is 0.5% to 5%.

9. The nonaqueous electrolyte according to claim 1, wherein
the nonaqueous electrolyte further comprises a film-forming additive selected from the group consisting of a cyclic carbonate compound with an unsaturated bond, a halogen-substituted cyclic carbonate compound, a sulfate compound, a sultone compound, a disulfonate compound, a nitrile compound, an aromatic compound, an isocyanate compound, a phosphazene compound, a cyclic anhydride compound, a phosphite compound, a phosphate compound, a borate compound, a carboxylate compound and any combination thereof.

10. The nonaqueous electrolyte according to claim 9, wherein the film-forming additive is selected from the group consisting of vinylene carbonate, fluoroethylene carbonate, difluoroethylene carbonate, 1,3-propane sultone, 1,3-propene sultone, adiponitrile, succinonitrile, and any combination thereof.

11. The nonaqueous electrolyte according to claim 9, based on a total weight of the nonaqueous electrolyte, a weight percentage of the film forming additive is 0.01% to 10%.

12. The nonaqueous electrolyte according to claim 1, wherein
the lithium salt is selected from one or more of LiPF$_6$, LiN(CF$_3$SO$_2$)$_2$, LiN(FSO$_2$)$_2$, LiBF$_4$, LiCF$_3$SO$_3$, and LiClO$_4$.

13. The nonaqueous electrolyte according to claim 12, wherein the lithium salt is a mixed lithium salt of LiPF$_6$ and LiN(FSO$_2$)$_2$.

14. A lithium-ion battery, comprising a positive electrode plate, a negative electrode plate, a separator, and nonaqueous electrolyte according to claim 1.

15. The lithium-ion battery according to claim 14, wherein an end-of-charge voltage of the lithium-ion battery U is 4.3V≤U≤6V.

16. The lithium-ion battery according to claim 14, wherein
the positive electrode plate comprises one or more of Li$_{1+x}$Ni$_a$Co$_b$M'$_{(1-a-b)}$O$_{2-c}$Y$_c$, and Li$_{1+y}$Ni$_m$Mn$_n$M''$_{2-m-n}$O$_{4-p}$Z$_p$,
wherein
−0.1≤x≤0.2, 0.6≤a≤1, 0≤b<1, 0≤(1-a-b)<1, 0≤c<1, M' is selected from one or more of Mn, Al, Mg, Zn, Ga, Ba, Fe, Cr, Sn, V, Sc, Ti, and Zr, and Y is selected from one or more of F, Cl, and Br; and
−0.1≤y≤0.2, 0.4≤m≤1.2, 0.8≤n≤1.6, 0≤(2-m-n)≤0.3, 0≤p≤1, M'' is selected from one or more of Al, Mg, Zn, Ga, Ba, Fe, Cr, Sn, V, Sc, Ti, and Zr, and Y is selected from one or more of F, Cl, and Br.

17. A battery module, comprising the lithium-ion battery according to claim 14.

18. A battery pack, comprising the battery module according to claim 17.

19. An apparatus, comprising the lithium-ion battery according to claim 14, wherein the lithium-ion battery is used as a power supply for the apparatus.

20. The apparatus according to claim 19, wherein the apparatus is one selected from the group consisting of a full electric vehicle, a hybrid electric vehicle, a plug-in hybrid electric vehicle, an electric bicycle, an electric scooter, an electric golf cart, an electric truck, an electric vessel, and an energy storage system.

* * * * *